Feb. 11, 1947.　　　　M. MALLORY　　　　2,415,506
INTERNAL-COMBUSTION ENGINE
Filed Feb. 7, 1945

INVENTOR.
Marion Mallory
BY
Barnes, Kisselle, Laughlin & Raisch
Attorneys

Patented Feb. 11, 1947

2,415,506

UNITED STATES PATENT OFFICE 2,415,506

INTERNAL-COMBUSTION ENGINE

Marion Mallory, Detroit, Mich.

Application February 7, 1945, Serial No. 576,586

3 Claims. (Cl. 123—53)

This invention relates to an internal combustion engine.

It is the object of this invention to produce an internal combustion engine which can be operated at very high compression without detonation.

Figure 1:
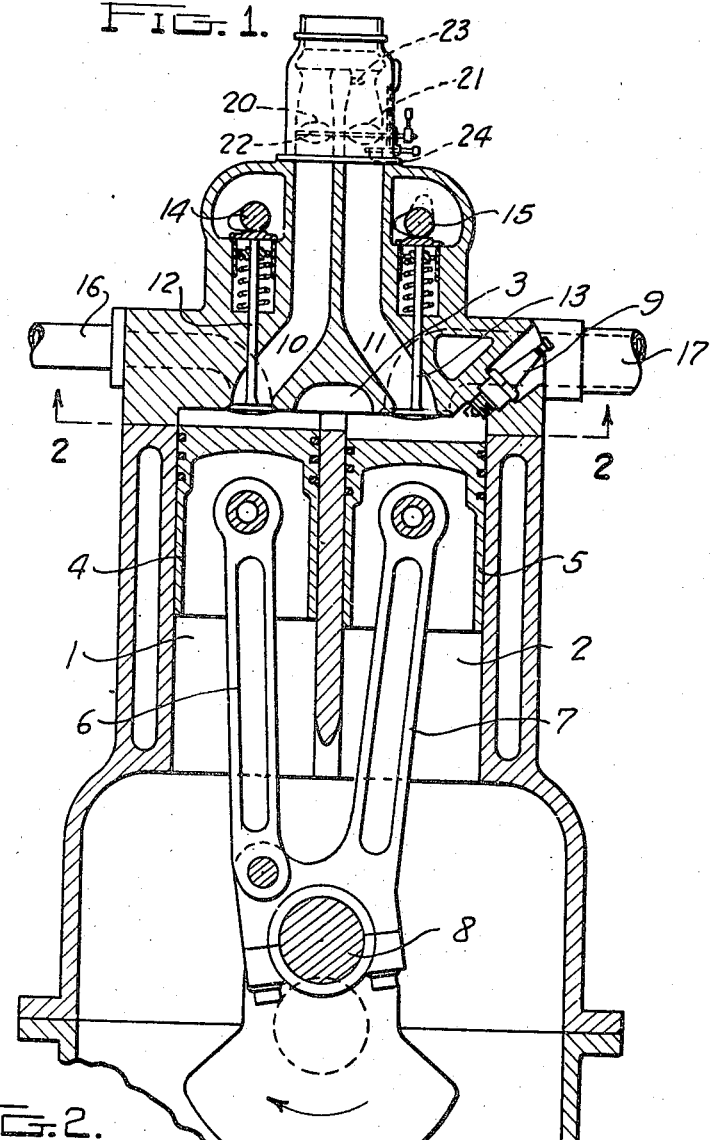
Fig. 1 is a vertical section through my engine.
Figure 2:
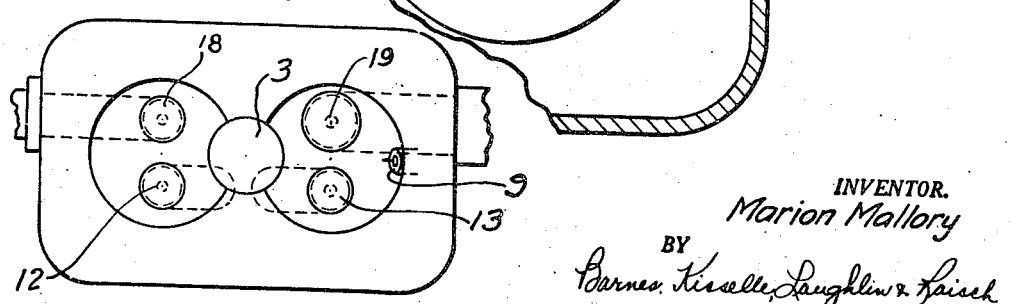
Fig. 2 is a section along the line 2—2 of Fig. 1.

The parts of my engine are as follows: Cylinders 1 and 2 which are in continuous unrestricted communication at their upper ends as at 3, pistons 4 and 5, connecting rods 6 and 7, crankshaft 8, spark plug 9, inlet passageways 10 and 11 controlled by valves 12 and 13, cams 14 and 15, exhaust passageways 16 and 17 controlled by exhaust valves 18 and 19, throttle valves 20 and 21 in intake passageways 10 and 11 respectively and mounted upon a common shaft 22, main fuel nozzle 23 and idling jet 24 in passageway 11.

Cylinders 1 and 2 represent one power unit corresponding to the single cylinder of the conventional engine.

Operation.—As herein shown my engine is a four cycle internal combustion engine. Piston 5 slightly leads piston 4. Air alone is drawn through intake passageway 10 and a carburetted fuel-air charge is drawn through passageway 11 on the intake stroke of the pistons. Throttles 21 and 22 open and close in unison. On the intake stroke of the pistons the vacuums in the two cylinders will be balanced which causes the vacuum in the one cylinder to oppose the vacuum in the other and prevent the air charge in cylinder 1 from commingling with the fuel-air charge in cylinder 2. This same condition exists on the compression stroke of the pistons because the compression pressures will be the same for each cylinder.

Near the end of the compression stroke the charge is ignited by means of electric spark plug 9. The compressed air charge in cylinder 1 acts to cushion the explosion in cylinder 2. The ignition starts at spark plug 9 in the rich fuel mixture zone and burns toward the lean zone in cylinder 1 above piston 4. This slows up the flame and prevents the burning charge in one part of the combustion chamber over piston 5 from raising the charge in the combustion chamber to such a high pressure in the other part of the combustion chamber that ignition takes place before the flame reaches it, that is, prevents detonation. At the time of combustion the mixture will be richest in the area of the spark plug and will be leanest in the combustion chamber area above piston 4 most remote from the spark plug. Thus, the flame will be traveling from a richer area toward a leaner mixture area. This stratification or controlling of the distribution of the fuel-air mixture in the combustion chamber prevents an enormous sudden rise in the explosion pressure in the combustion chamber and produces a high combustion pressure in the combustion chamber when the crankshaft 8 is turned beyond dead center to a position where the explosive force can exert a greater or more advantageous leverage on the crankshaft. The cam actuated intake valves 12 and 13 will be operated in unison and the same is true of the cam controlled exhaust valves 18 and 19.

I claim:

1. An internal combustion engine comprising two cylinders, reciprocating pistons in said cylinders, a communication open at all times between the heads of said cylinders, valve controlled intake and exhaust ports for each of said cylinders, intake passageways communicating with the intake ports of each cylinder, the intake valves for said cylinders operating substantially in unison, the exhaust valves for said cylinders operating substantially in unison, throttle valves in said intake passageways arranged to open and close in unison, air alone flowing through one of said passageways into one of said cylinders, a carburetor for feeding a carburetted fuel-air mixture into the other of said passageways and into the other of said cylinders, electric ignition means only for the cylinder receiving the carburetted charge, the pistons in the said cylinders reciprocating substantially in unison on their intake, compression, power and exhaust strokes whereby the pressures in the cylinders are substantially balanced on the intake and compression strokes to effect segregation of the charges in said cylinders and the mixture in the combustion chamber is richest in the area adjacent the electric ignition means and leanest in the area most remote therefrom and during combustion the flame travels from a rich fuel mixture area toward a leaner fuel mixture area.

2. In an engine having two cylinders and reciprocating pistons therein, a communication open at all times between the heads of said cylinders, the said cylinders and pistons cooperating to define combustion chambers which are joined through said communication, separate intake manifolds connected to the intake ports of each of the cylinders, a fuel carburetor connected to one of said manifolds, intake valves for said intake ports, and throttle valves for said intake manifolds, the said throttle valve, intake manifold, and intake port and valve for the one cylinder being coordinated in operation and size with the intake manifold, throttle valve, intake port and valve of the other cylinder whereby the pressure in the combustion chambers of both cylinders are maintained approximately equal during the intake and compression strokes of the pistons to effect segregation of the charges in said cylinders, and electric ignition means only in the cylinder receiving the caurburetted charge, said electric ignition means being positioned on the side of the intake port for said last mentioned cylinder remote from the intake port for the other cylinder whereby during combustion the flame travels from the rich fuel mixture area adjacent the ignition means toward the leaner fuel mixture area remote from the ignition means, the pressure rise incident to the initiation of combustion causing the rich fuel mixture in the one cylinder to move into and commingle with the air in the other cylinder.

3. In an engine having two cylinders and reciprocating pistons therein, a communication open at all times between the heads of said cylinders, the said cylinders and pistons cooperating to define combustion chambers which are joined through said communication, separate intake manifolds connected to the intake ports of each of the cylinders, a fuel carburetor connected to one of said manifolds, intake valves for said intake ports, and throttle valves for said intake manifolds arranged to open and close in unison, the said throttle valve, intake manifold, and intake port and valve for the one cylinder being coordinated in operation and size with the intake manifold, throttle valve, intake port and valve of the other cylinder whereby the pressure in the combustion chambers of both cylinders are maintained approximately equal during the intake and compression strokes of the pistons to effect segregation of the charges in said cylinders, and electric ignition means only in the cylinder receiving the carburetted charge, said electric ignition means being positioned on the side of the fuel mixture intake port more remote from the air inlet port whereby during combustion the flame travels from the rich fuel mixture area adjacent the ignition means toward the leaner fuel mixture area remote from the ignition means, the pressure rise incident to combustion causing the rich fuel mixture in the one cylinder to move into and commingle with the air in the other cylinder.

MARION MALLORY.

REFERENCES CITED

The following references are of record in the file of this patent:

UNITED STATES PATENTS

| Number | Name | Date |
|---|---|---|
| 1,969,815 | Meyer | Aug. 14, 1934 |
| 2,234,267 | Mallory | Mar. 11, 1941 |
| 546,481 | Bary | Sept. 17, 1895 |
| 806,195 | De Sanderval | Dec. 5, 1905 |
| 848,029 | Haselwander | Mar. 26, 1907 |
| 941,138 | Frost | Nov. 23, 1909 |
| 1,498,757 | Robertson | June 24, 1924 |
| 1,685,639 | Lagali | Sept. 25, 1928 |